United States Patent
Theodora et al.

(10) Patent No.: US 6,446,078 B1
(45) Date of Patent: Sep. 3, 2002

(54) METHODS OF STORING AND DEPACKAGING ATTRIBUTES OF AN OBJECT

(75) Inventors: Eric Theodora, Les Ulis; Bruno Aidan, St Gratien, both of (FR)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/247,069

(22) Filed: Feb. 9, 1999

(30) Foreign Application Priority Data

Mar. 5, 1998 (FR) .............................................. 98 02685

(51) Int. Cl.⁷ .............................................. G06F 17/30
(52) U.S. Cl. ........................ 707/103; 707/10; 707/100; 709/201; 709/238
(58) Field of Search ......................... 707/10, 103, 102, 707/100, 4; 709/201, 213, 220, 238; 395/701

(56) References Cited

U.S. PATENT DOCUMENTS

| | | | | |
|---|---|---|---|---|
| 5,519,867 A | * | 5/1996 | Moeller et al. | 709/107 |
| 5,692,180 A | * | 11/1997 | Lee | 707/10 |
| 5,907,704 A | * | 5/1999 | Gudmundson et al. | 395/701 |
| 5,915,253 A | * | 6/1999 | Christiansen | 707/103 |
| 5,951,649 A | * | 9/1999 | Dobbins et al. | 709/238 |
| 5,995,753 A | * | 11/1999 | Walker | 395/702 |
| 6,032,151 A | * | 2/2000 | Arnold et al. | 707/103 |
| 6,041,347 A | * | 3/2000 | Harsham et al. | 709/220 |
| 6,052,528 A | * | 4/2000 | Dechamboux | 395/708 |
| 6,173,289 B1 | * | 1/2001 | Sonderegger et al. | 707/103 |
| 6,249,820 B1 | * | 6/2001 | Dobbins et al. | 709/238 |
| 6,278,995 B1 | * | 8/2001 | Hawkinson | 707/4 |
| 6,321,259 B1 | * | 11/2001 | Ouellette et al. | 709/220 |

FOREIGN PATENT DOCUMENTS

| EP | 0 631 229 A2 | 12/1994 |
|---|---|---|
| EP | 0 690 375 A3 | 1/1996 |

OTHER PUBLICATIONS

Goldman, E. James, Applied Data Communications: A Business–oriented Approach, pp. 316–319, 1995.*

"Automatic Resolution of Dependent Objects in a Data System", IBM Technical Disclosure Bulletin, vol. 37, No. 6B, Jun. 1, 1994, pp. 513–515.

* cited by examiner

Primary Examiner—Jean R. Homere
(74) Attorney, Agent, or Firm—Sughrue Mion, PLLC

(57) ABSTRACT

A method of storing in a packet attributes associated with an object corresponding to a class that is part of an inheritance tree, each class in the inheritance tree including a storage method including an index parameter, includes the following steps: calling storage methods of parent classes, if any, incrementing the index parameter, placing a first free address in the packet into the packet at an address determined by the index parameter, and copying attributes of a current class into the packet from the first free address with an identifier of the current class. The storage method calls the storage method of the corresponding class with a null value of the index parameter.

4 Claims, 2 Drawing Sheets

FIG_1
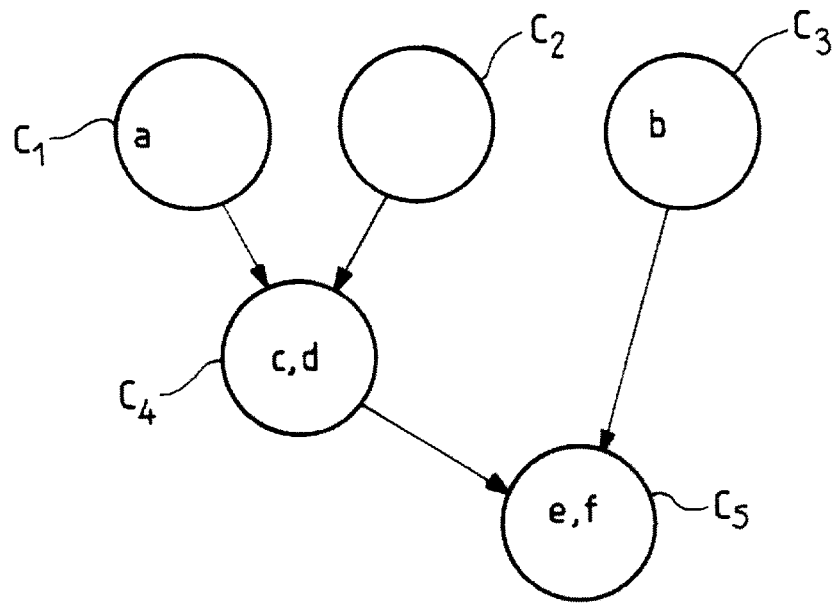
FIG_2
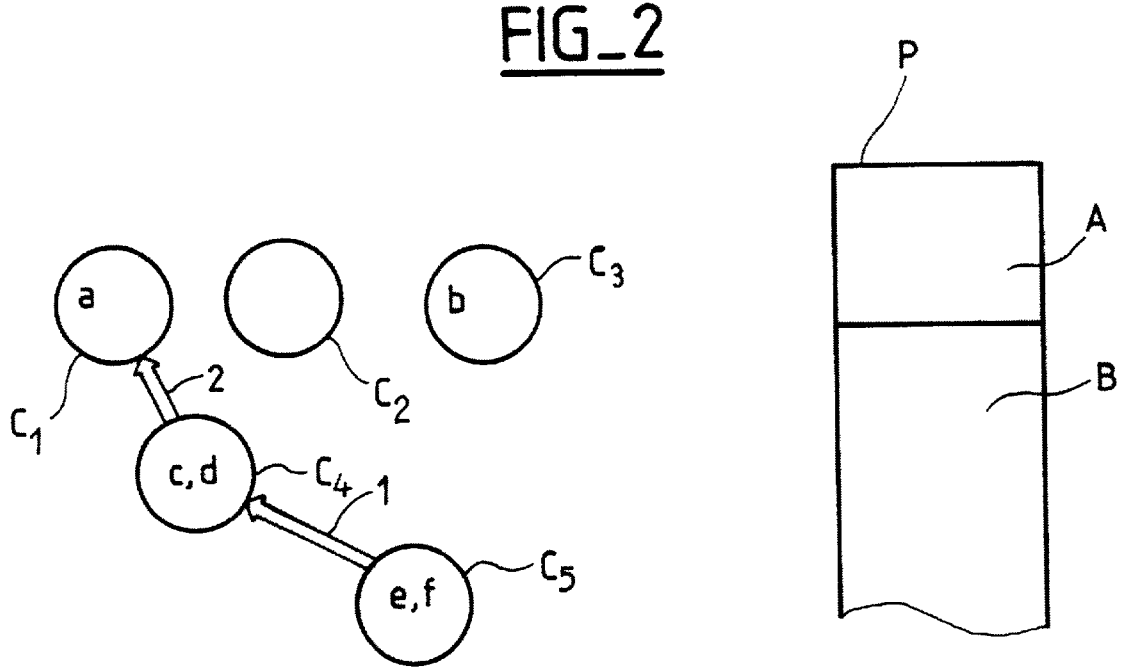

FIG_3
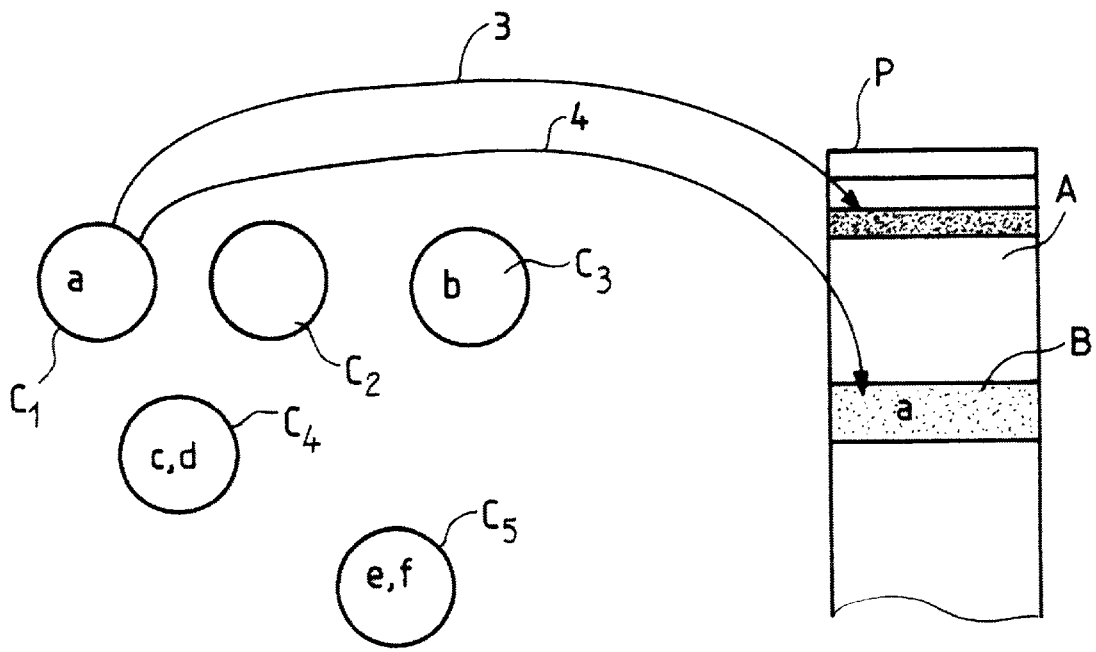
FIG_4
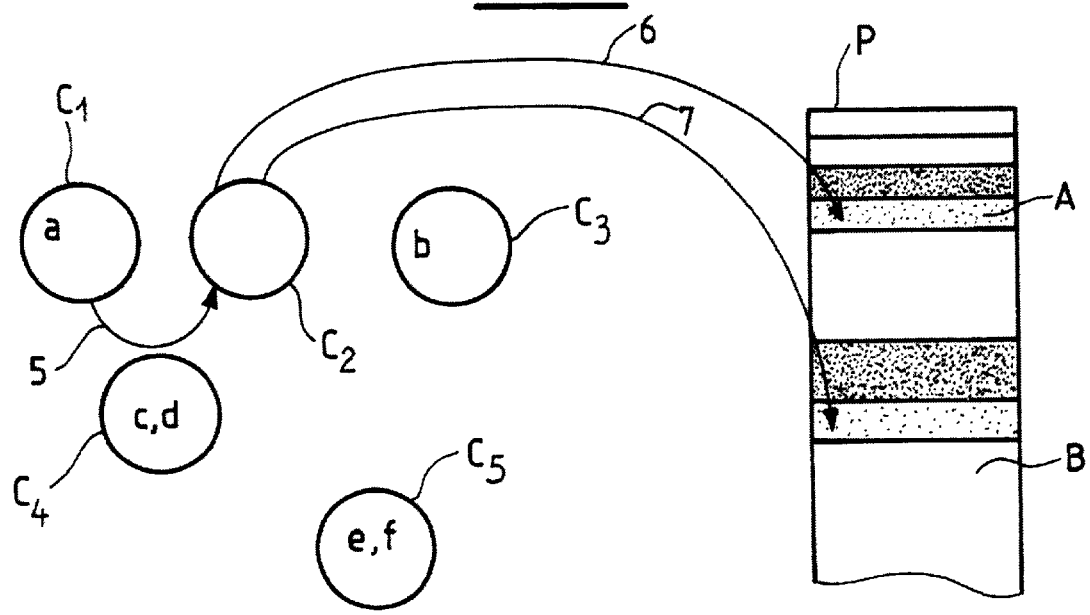

METHODS OF STORING AND DEPACKAGING ATTRIBUTES OF AN OBJECT

BACKGROUND OF THE INVENTION

1. Field of the Invention

The present invention concerns a method for storing data associated with an object (in the sense of object-oriented programming) in another data structure called a packet.

It also concerns a method of depackaging this other data structure to reconstruct an object similar to the original object.

The invention has one application in transmitting an object via a data processing network or for storing it on a data storage medium.

2. Description of the Prior Art

Object-oriented programming is based on the concepts of class, objects and inheritance.

From a very general point of view an object can be seen as a structure comprising a set of data (known as attributes) and a set of processes for manipulating the data (known as methods). Each object is an instance of a class.

Inheritance is a relation between two classes in which one is deemed to be the ancestor of the other. A class A inheriting from a class B inherits all its attributes and methods.

More comprehensive definitions of the above concepts can be found in various works covering object-oriented programming. Examples include Object-Oriented Design With Applications by Booch and Grady, 1991, or the C++ Programming Language (2nd edition) by Bjarne Stroupstrup, 1991, or Dictionary of Computing, Oxford University Press, 1990.

The concept of inheritance implies that an attribute (or a method) associated with a particular object can be either local to the class corresponding to that object or inherited from a parent class of that class.

To clarify this concept refer to the accompanying FIG. 1 which shows one example of an inheritance tree. Class $C_5$ inherits from classes $C_3$ and $C_4$. Class $C_4$ inherits from classes $C_1$ and $C_2$. The attributes associated with class $C_5$ are e and f, which are local attributes, and a, b, c and d, which are inherited from classes $C_1$, $C_3$ and $C_4$.

Consequently, storing the values of attributes associated with an object cannot be effected with reference only to that object. To the contrary, it is necessary to consider all of the inheritance tree of which its class is part.

A first aim of the present invention is to propose a method of storing the values of attributes associated with an object in another data structure (known as a packet) to facilitate transferring those values via a network or their storage on a data storage medium.

SUMMARY OF THE INVENTION

To this end, the invention consists in a method of storing in a packet attributes associated with an object corresponding to a class that is part of an inheritance tree, each class in the inheritance tree including a storage method including an index parameter, the method comprising the following steps:

calling storage methods of parent classes, if any, incrementing the index parameter, placing a first free address in the packet into the packet at an address determined by the index parameter, and copying attributes of a current class into the packet from the first free address with an identifier of the current class, and the method calling the storage method of the corresponding class with a null value of the index parameter.

A second object of the present invention is to propose a method of depackaging the attributes stored in the above manner in order to reconstruct the original object. To this end the method of the invention includes the following steps:

calling the builders of parent classes, if any, fixing the value of the index parameter, recovering a data address in the packet at an address determined by the index parameter, recovering values of attributes in the packet at the data address.

The various advantages and features of the invention will become more apparent in the following description with reference to the accompanying drawings.

BRIEF DESCRIPTION OF THE DRAWINGS

FIG. 1, already described, shows one example of an inheritance tree.

FIGS. 2 through 4 show the various steps of implementing the packaging method of the invention applied to the above example of an inheritance tree.

DETAILED DESCRIPTION OF THE PREFERRED EMBODIMENT

FIG. 2 shows the recursive call that represents the first step of the storage method: each storage method calls the storage method of a parent class until a root of the inheritance tree is reached.

The method begins by calling the storage method of the class corresponding to the object to be pocketed. The index parameter then has the value 0.

To enable the class of the pocketed object to be identified at the time of depackaging a class identifier can be stored in the package, for example in a header.

This step is not mandatory, however, because the context may eliminate any ambiguity as to the identity of the object stored in the packet.

FIG. 2 shows that the storage method of class $C_5$ of which an instance is to be pocketed first calls the storage method of class $C_4$ (step 1 in the figure). At this stage the index parameter with which the storage method is called has the value 1.

The method of the invention does not depend in any way on the order in which the storage methods of the parent classes are called. In this example the storage method of class $C_3$ could have been called first without the result being different in any way.

Similarly, the storage method of class $C_4$ calls the storage method of class $C_1$, for example, with an index parameter value of 2 (step 2).

Class $C_1$ does not have any ancestors. The recursive call therefore ceases and the method executes its subsequent steps.

The subsequent steps can be implemented in various ways. In one particular implementation the packet has two parts in succession, namely a first part called the address block (A) and a second part called the body (B). This implementation is described hereinafter but other implementations are possible, in particular with the first and second parts in reverse order.

Step 3 in FIG. 3 consists in storing in the address block the address of the first free part of the body of the packet.

The area of the address block in which said address must be written is determined by the index parameter.

In the concrete example described here, the index value is 2. Also, the area can be that whose address relative to the start of the address block has the value 2 (which is the third area because the process started from address 0).

The address to write in this area is that of the first free part of the body of the packet, which here is the address of the start of the body (B).

Step 4 consists in copying the values of the attributes specific to the current class, i.e. to class $C_1$, starting from this latter address. The value of the attribute "a" is therefore stored from that address. An identifier of the current class (i.e. class $C_1$) is also stored to enable depacketing of the packet.

The storage method of class $C_1$ then terminates and execution of the storage method of class $C_4$ resumes.

FIG. 4 shows the subsequent steps of this implementation of the invention. Step 5 represents termination of the storage method of class $C_1$ and calling of the storage method of class $C_5$ by the storage method of class $C_4$.

The index parameter is incremented again when the storage method of class $C_2$ is called and therefore has the value 3.

As previously, the value of the first free address of the body (B) of the packet is stored in the appropriate area of the address block (A) (step 6).

The first free address of the body of the packet is that of the start of the body plus the size of the data formed by the attributes of class $C_1$ and the identifier of class $C_1$.

The appropriate area of the address block is that identified by the index parameter, which is the fourth area.

After the attributes and the identifier of class $C_2$ have been stored in the appropriate part of the body (step 7) the storage method of class $C_2$ terminates and the storage method of class $C_4$ can continue.

The subsequent steps of application of the method of the invention to the proposed example will not be described further because they will be evident to the skilled person.

The packets formed by the process just described are depacketed in a fairly similar manner. The aim of the depacketing is to read the data contained in a packet in order to recreate the object.

Thus the class corresponding to the object to be depacketed is determined. As previously indicated, an identifier of that class can be stored in a header of the packet and the class can be determined by reading the identifier.

The builder of that class is then called.

The next step is to call the builders of the parent classes of the class corresponding to the object using an index parameter value coherent with that used by the storage method.

Coherence can be achieved by using a rule to call the builders of parent classes. For example, the parent classes to the right in the inheritance tree can be called first and those on the left last.

The next step is to read another address, known as the data address, at the location determined by the index parameter.

This address points to an area in the body (B) of the packet that contains the data specific to the current class.

The next step is therefore to read that data and to assign it to the object being created.

As previously explained in connection with storing the object, the recursive call mechanism is such that all classes of the inheritance tree are covered.

What is claimed is:

1. A method for sending an object, the object corresponding to a class, said class being part of an inheritance tree constituted by one or more classes, the method comprising:
    providing a storage method in the one or more classes;
    defining a packet, including an address block, and a body;
    setting an index parameter to an initial value;
    recursively traversing the inheritance tree of the object by calling the respective storage method of any parent classes in the inheritance tree, incrementing the index parameter with each upward traversing step;
    during the traversing, when one of the classes encountered has no ancestor or has no ancestor yet to be encountered:
        determining a next free body address;
        writing, into the address block at a location based on a current value of the index parameter, an indicator of the determined next free body address; and
        writing a class identifier and any attributes of the one of the classes encountered into the body at the next free body address;
    ending the traversing after all of the classes in the inheritance tree of the object have been encountered; and
    sending the packet to send the object.

2. The method as claimed in claim 1, further comprising:
    providing a header for the packet; and
    storing in the header an identifier of a corresponding class of the object.

3. The method as claimed in claim 1, wherein the address block has a predetermined size.

4. A method of depacketing an object from a packet formed by a method as claimed in claim 1, comprising:
    providing a builder method in the one or more classes;
    depacketing the object by repeatedly performing, in order:
        calling the builder method of any of parent classes identified in the packet, using the value of the index parameter;
        for the current class, recovering a data address in the packet at an address based on the index parameter; and
        for the current class, recovering from the packet values of attributes of the object at the data address.

* * * * *